(12) United States Patent
Kimura et al.

(10) Patent No.: US 12,296,320 B2
(45) Date of Patent: May 13, 2025

(54) EXHAUST GAS CLEANING CATALYST STRUCTURE AND PRODUCTION METHOD THEREFOR

(71) Applicants: HONDA MOTOR CO., LTD., Tokyo (JP); Mitsui Mining & Smelting Co., Ltd., Tokyo (JP)

(72) Inventors: Toshiaki Kimura, Tokyo (JP); Koji Ueno, Tokyo (JP); Takeshi Endo, Tokyo (JP); Akiko Iwasa, Tokyo (JP); Shumpei Suzuki, Tokyo (JP); Toshiharu Moriya, Saitama (JP); Ohki Houshito, Saitama (JP); Yunosuke Nakahara, Saitama (JP)

(73) Assignees: HONDA MOTOR CO., LTD., Tokyo (JP); Mitsui Mining & Smelting Co., Ltd., Tokyo (JP)

( * ) Notice: Subject to any disclaimer, the term of this patent is extended or adjusted under 35 U.S.C. 154(b) by 696 days.

(21) Appl. No.: 17/611,372

(22) PCT Filed: May 13, 2020

(86) PCT No.: PCT/JP2020/019041
§ 371 (c)(1),
(2) Date: Nov. 15, 2021

(87) PCT Pub. No.: WO2020/241250
PCT Pub. Date: Dec. 3, 2020

(65) Prior Publication Data
US 2022/0212173 A1   Jul. 7, 2022

(30) Foreign Application Priority Data
May 24, 2019 (JP) ................................. 2019-097452

(51) Int. Cl.
*B01J 21/04* (2006.01)
*B01J 23/10* (2006.01)
(Continued)

(52) U.S. Cl.
CPC ............... *B01J 23/63* (2013.01); *B01J 35/56* (2024.01); *B01J 37/0225* (2013.01);
(Continued)

(58) Field of Classification Search
CPC ... B01J 21/04; B01J 23/10; B01J 23/42; B01J 23/44; B01J 23/464; B01J 23/63; B01J 35/56; F01N 3/101
(Continued)

(56) References Cited

U.S. PATENT DOCUMENTS 6,071,850 A * 6/2000 Friedman ............... B01J 37/348
502/340
9,579,633 B2 2/2017 Suzuki et al.
(Continued)

FOREIGN PATENT DOCUMENTS

CN   104005821 A   8/2014
JP   5-184926 A    7/1993
(Continued)

OTHER PUBLICATIONS

International Search Report (ISR) dated Jul. 14, 2020 filed in PCT/JP2020/019041.

*Primary Examiner* — Cam N. Nguyen
(74) *Attorney, Agent, or Firm* — RANKIN, HILL & CLARK LLP

(57) ABSTRACT

Provided are an exhaust gas purifying catalyst structure that inhibits foil elongation and improves structural durability and a production method therefor. The exhaust gas purifying catalyst structure has a metal support configured by using an mantle and a metal foil provided in the mantle and forming (Continued)

an exhaust gas flow path, and a catalyst layer provided on a surface forming the flow path of the metal foil, wherein the catalyst layer contains a noble metal, an OSC material containing cerium and a rare earth element other than cerium (non-Ce rare earth element), and alumina, and a content of the non-Ce rare earth element with respect to 100% by mass of the catalyst layer is 2.52% by mass or more and 4.62% by mass or less in terms of an oxide.

14 Claims, 1 Drawing Sheet

(51) Int. Cl.
*B01J 23/42* (2006.01)
*B01J 23/44* (2006.01)
*B01J 23/46* (2006.01)
*B01J 23/63* (2006.01)
*B01J 35/56* (2024.01)
*B01J 37/02* (2006.01)
*F01N 3/10* (2006.01)

(52) U.S. Cl.
CPC .......... *F01N 3/101* (2013.01); *F01N 2570/10* (2013.01); *F01N 2570/12* (2013.01); *F01N 2570/14* (2013.01)

(58) Field of Classification Search
USPC ......... 502/302–304, 332–334, 339, 355, 415
See application file for complete search history.

(56) References Cited

U.S. PATENT DOCUMENTS

| | | | |
|---|---|---|---|
| 10,753,248 B2* | 8/2020 | Hirota | F01N 3/101 |
| 11,135,577 B2* | 10/2021 | Fujimura | B01J 35/56 |
| 11,524,284 B2* | 12/2022 | Takasaki | B01J 37/0225 |
| 2002/0128151 A1* | 9/2002 | Galligan | F01N 3/2864 |
| | | | 422/180 |
| 2003/0165414 A1* | 9/2003 | Galligan | B01D 53/94 |
| | | | 423/213.2 |
| 2010/0158768 A1* | 6/2010 | Iwachido | B01J 23/63 |
| | | | 502/328 |
| 2014/0242406 A1 | 8/2014 | Kimura et al. | |
| 2019/0111389 A1* | 4/2019 | Camm | B01D 53/945 |

FOREIGN PATENT DOCUMENTS

| | | |
|---|---|---|
| JP | 2010-227739 A | 10/2010 |
| JP | 2011-156505 A | 8/2011 |
| JP | 2014-161809 A | 9/2014 |
| JP | 2017-164735 A | 9/2017 |
| WO | 2010/109734 A1 | 9/2010 |

* cited by examiner

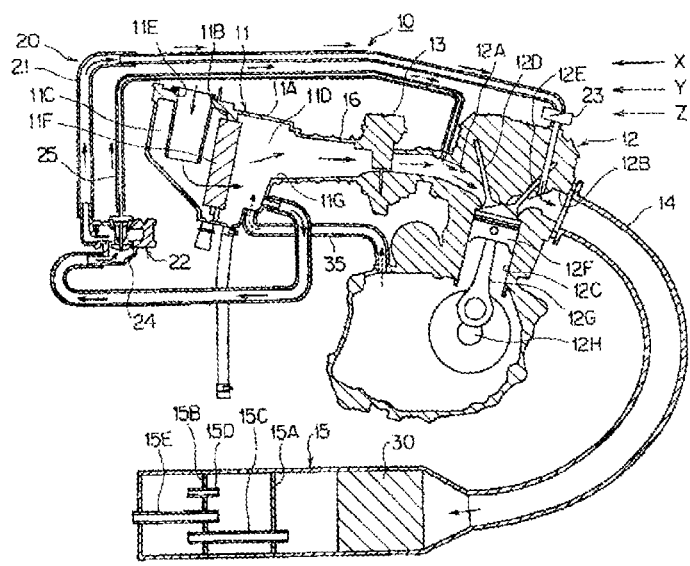

EXHAUST GAS CLEANING CATALYST STRUCTURE AND PRODUCTION METHOD THEREFOR

CROSS-REFERENCE TO RELATED APPLICATIONS

This application is a National Phase Application of International Application No. PCT/JP2020/019041, filed May 13, 2020, which claims the priority of Japan Patent Application No. 2019-097452, filed May 24, 2019. The present application claims priority from both applications and each of these applications is herein incorporated in their entirety by reference.

TECHNICAL FIELD

The present invention relates to an exhaust gas purifying catalyst structure that can be suitably used for purifying an exhaust gas emitted from an internal combustion engine of vehicles, including a motorcycle and a four-wheeled vehicle, etc., and a production method therefor.

BACKGROUND ART

Three-way catalysts (TWCs) that can oxidize and reduce carbon monoxide (CO), hydrocarbon (HC) and nitrogen oxide (NOx) have been used as catalysts for treating an exhaust gas emitted from internal combustion engines of automobiles, etc. (hereinafter referred to as "exhaust gas purifying catalysts"). The three-way catalyst in which a catalyst composition obtained by supporting a noble metal such as palladium (Pd) or rhodium (Rh) that is a catalytically active component on an inorganic porous body having a high specific surface area is provided on a base material comprising ceramics or a metal as a catalyst layer has been known.

Here, since the exhaust gas purifying catalyst of a saddle-ridden type vehicle such as a motorcycle may be subject to large vibration depending on the traveling conditions, a metal support made of stainless steel having excellent impact resistance, etc., is usually used as a base material for forming the catalyst layer. Examples of the metal support include a honeycomb body provided with a mantle and a metal foil provided inside the mantle and forming an exhaust gas flow path. Moreover, the exhaust gas purifying catalyst for saddle-ridden type vehicles has a limited space for mounting the catalyst as compared to the exhaust gas purifying catalyst for four-wheeled vehicles, and is required to exhibit high purifying performance in spite of its small capacity.

As such an exhaust gas purifying catalyst for saddle-ridden type vehicles, for example, a catalyst structure in which a catalyst layer containing palladium (Pd) that is a metal having a high ability to catalyze an oxidation reaction of HC and CO, and a catalyst layer containing rhodium (Rh) that is a metal having a high ability to catalyze a reduction reaction of NOx are laminated on a metal support has been known. However, such a catalyst structure needs to be produced by carrying out two steps comprising a step of forming a catalyst layer containing Pd and a step of forming a catalyst layer containing Rh, which leads to a problem of high production cost. Therefore, from the viewpoint of reducing the production cost, a catalyst structure in which a catalyst layer containing both Pd and Rh is formed in one step is desired.

For example, Patent Literature 1 discloses a catalyst in which palladium particles and rhodium particles that have been preliminarily grown to specific particle sizes are supported on separate support particles, respectively, in order to inhibit a decrease in active sites due to the growth of noble metal particles caused by fluctuations of the temperature and atmosphere depending on driving conditions of an automobile.

CITATION LIST

Patent Literature

Patent Literature 1

Japanese Patent Laid-Open No. 2017-164735

SUMMARY OF INVENTION

Technical Problem

However, the catalyst disclosed in Patent Literature 1 has preliminarily supported palladium particles and rhodium particles that are catalytically active components on separate support particles, respectively, which needs to employ a step of forming a first material in which the palladium particles supported on the first support particle have been grown to a predetermined particle size, and a step of forming a second material in which the rhodium particles supported on the second support particle have been grown to a predetermined particle size, which causes a problem of difficulty in reducing the production cost.

Further, the present inventors have found that when the catalyst disclosed in Patent Literature 1 is formed on a metal support, the following problems occur. First, for the three-way catalyst, it is known to use the promoter (hereinafter referred to as "OSC material") having an oxygen storage capacity (OSC) in order to improve the catalytic performance. It is also known that by incorporating a rare earth element other than cerium (non-Ce rare earth element) into this OSC material, the oxygen storage capacity may be improved to enable to further improve the catalytic performance. However, the present inventors have found, as a result of the investigation, that when the catalyst disclosed in Patent literature 1 is formed on a metal support and a material containing the non-Ce rare earth element is used as the OSC material, it sometimes leads to occurrence of a phenomenon in which the metal foil of the metal support may be stretched due to the tensile force caused by the volume expansion. It is conjectured to be caused by the fact that the non-Ce rare earth element contained in the catalyst layer readily diffuses into the oxide film formed on the surface of the metal foil and undergoes solid dissolution, and when the non-Ce rare earth element diffuses into the oxide film, the oxide film undergoes volume expansion when exposed to an elevated temperature due to the fluctuation of driving conditions of an automobile, and the metal foil is stretched by the tensile force due to this volume expansion. This phenomenon of the metal foil elongation (hereinafter referred to as "foil elongation") is conjectured to be also caused by the fact that there is temperature difference between the central portion and the outer peripheral portion of the honeycomb body, which leads to the expansion of the metal foil in the axial direction in the vicinity of the center of the honeycomb body.

Therefore, an object of the present invention is to provide an exhaust gas purifying catalyst structure that enables to reduce the production cost and inhibit foil elongation, and a production method therefor.

Solution to Problem

The first aspect of the present invention proposes
an exhaust gas purifying catalyst structure comprising: a metal support configured by using an mantle and a metal foil provided inside the mantle and forming an exhaust gas flow path; and
a catalyst layer provided on a surface forming the flow path of the metal foil, wherein
the catalyst layer contains a noble metal, an OSC material comprising cerium and a rare earth element other than cerium (non-Ce rare earth element), and alumina, and a content of the non-Ce rare earth element with respect to 100% by mass of the catalyst layer is 2.52% by mass or more and 4.62% by mass or less in terms of an oxide.
The second aspect of the present invention proposes
a method for producing an exhaust gas purifying catalyst structure, comprising:
a step of adding alumina to a solution comprising a first noble metal and supporting the first noble metal on the alumina to form a slurry comprising the alumina supporting the first noble metal, adding an OSC material comprising cerium and a rare earth element other than cerium (non-cerium rare earth element) and a solution comprising a second noble metal to the slurry in this order, and supporting the second noble metal on the OSC material to form a slurry further comprising the OSC material supporting the second rare metal; and
a step of attaching the slurry to the metal support configured by using the mantle and the metal foil provided inside the mantle and forming an exhaust gas flow path, to form a catalyst layer, wherein
the catalyst layer contains a non-Ce rare earth element in a content of 2.52% by mass or more and 4.62% by mass or less in terms of an oxide with respect to 100% by mass of the catalyst layer.

Advantageous Effects of Invention

While the exhaust gas purifying catalyst structure proposed by the present invention maintains a capability of absorbing and releasing oxygen of the OSC material contained in the catalyst layer by keeping the content of non-Ce rare earth element contained in the catalyst layer within a specific range, it can inhibit the rare earth element from diffusing into the oxide film formed on the surface of the metal foil to inhibit the foil elongation and to improve the structural durability.

The method for producing the exhaust gas purifying catalyst structure proposed by the present invention can form a catalyst layer comprising alumina supporting a first noble metal and an OSC material supporting a second noble metal and comprising cerium and a non-Ce rare earth element in one layer, and it can reduce production steps and the production cost. Moreover, the method for producing the exhaust gas purifying catalyst structure proposed by the present invention enables to selectively support two noble metals each on two separate supports in one step, and therefore, even when one catalyst layer containing two noble metals is formed, the obtained exhaust gas purifying catalyst structure in which the two noble metals are unlikely to be alloyed due to elevated temperatures, can inhibit deterioration of the catalytic performance and furthermore the foil elongation, and is also excellent in structural durability.

BRIEF DESCRIPTION OF DRAWING

FIG. 1 is a schematic view illustrating an example of an exhaust gas purifying device of a saddle-ridden type vehicle suitable for mounting the exhaust gas purifying catalyst structure of the present invention and an example of its peripheral configuration.

DESCRIPTION OF EMBODIMENTS

Next, the present invention will be described based on examples in embodiments. However, the present invention is not limited to the embodiments described below.

An example of the embodiment of the present invention is an exhaust gas purifying catalyst structure having a metal support configured by using an mantle and a metal foil provided inside the mantle and forming an exhaust gas flow path, and a catalyst layer provided on a surface of the metal foil and forming the flow path, wherein the catalyst layer contains a noble metal, an OSC material containing cerium and a rare earth element other than cerium (non-Ce rare earth element), and alumina, and a content of the non-Ce rare earth element with respect to 100% by mass of the catalyst layer is 2.52% by mass or more and 4.62% by mass or less in terms of an oxide.

Metal Support

The metal support has a mantle and a metal foil provided inside the mantle and forming an exhaust gas flow path. The mantle may have, for example, a cylindrical shape having an opening in the front-rear direction. Examples of the material constituting the mantle of the metal support can include refractory metals such as stainless steel (SUS) and corrosion-resistant alloys based on iron.

Metal Foil

The metal foil is preferably made of stainless steel containing aluminum (Al). When the metal foil is made of stainless steel containing Al, an oxide film containing aluminum oxide ($Al_2O_3$) as a main component is formed on the surface of the metal foil, and the oxidation resistance can be improved. The metal foil is more preferably made of Fe—Cr—Al-based stainless steel in order to improve the oxidation resistance at elevated temperatures. The stainless steel containing Al that is a raw material of the metal foil may contain C and Si in order to improve the toughness of the metal foil, in addition to Al and each element of Fe and Cr contained as necessary, and Mn may be contained in order to improve the oxidation resistance. Further, the stainless steel containing Al that is a raw material of the metal foil may contain a rare earth element such as La in order to improve the adhesion of the $Al_2O_3$ oxide film.

The content of aluminum (Al) in the metal foil is preferably 3.0% by mass or more and 6.0% by mass or less. When the Al content in the metal foil is 3.0% by mass or more and 6.0% by mass or less, a film of aluminum oxide ($Al_2O_3$) can be formed on the surface of the metal foil serving as the exhaust gas flow path surface without decreasing the toughness of the metal foil, which can improve the oxidation resistance at elevated temperatures.

The metal support preferably has a flat metal foil and a corrugated metal foil inside the mantle. By alternately superimposing the flat metal foil and the corrugated metal foil, fine and parallel gas flow paths in which fluid flows inside the mantle, i.e., a honeycomb body having a number of channels (also referred to as a "metal honeycomb") can be configured. The metal support is formed in a roll shape by alternately stacking the flat metal foil and corrugated metal foil and winding them multiple times in an axial direction, and can be formed by joining the peripheral portion of the roll shape with the inside portion of the mantle. The contact portion of the flat metal foil with the corrugated metal foil may be joined by, for example, diffusion joining or brazing joining, and the contact portion of the corrugated metal foil or flat metal foil that is to be a peripheral portion with the mantle may be joined by brazing joining, etc. A catalyst layer can be formed by attaching a slurry described later to the surface forming the exhaust gas flow path, i.e., the inner wall surface of each channel of the metal support by wash coating, etc.

The thickness of the metal foil is preferably a thickness that can increase the number of exhaust passages (cells) of the metal honeycomb per unit area to improve the cell density and reduce the back pressure. The thickness of the metal foil may be adjusted according to the cell density of the metal honeycomb, but it is preferably 20 μm or more and 60 μm or less and more preferably 30 μm or more and 50 μm or less. In particular, when the number of cells of the metal honeycomb is 300 cells per square inch, the thickness of the metal foil is preferably 45 μm or more and 55 μm or less, and in the case of 400 cells per square inch, the thickness of the metal foil is preferably 25 μm or more and 45 μm or less and more preferably 30 μm or more and 40 μm or less.

For the metal honeycomb, for example, two honeycomb bodies may be arranged side by side on the entering gas side and the discharging gas side at regular intervals in a metal outer cylinder. The honeycomb body may be arranged inside an exhaust pipe or muffler, which is used as the mantle.

Moreover, it is also possible to use a cylindrical punching metal. When a punching metal called a punching pipe or a punching tube is used, heat resistance is improved and a through hole is formed by punching, so that a large area can be obtained, exhaust gas purifying performance is improved, and exhaust resistance in the exhaust pipe is small, and therefore, it can be used, for example, in an exhaust gas purifying device for a motorcycle or a four-wheeled vehicle.

Catalyst Layer

The catalyst layer contains a noble metal, an OSC material containing cerium and a rare earth element other than cerium, and alumina, and the content of the rare earth element other than cerium (non-Ce rare earth element) in terms of an oxide with respect to 100% by mass of the catalyst layer is in a range of 2.52% by mass or more and 4.62% by mass or less, preferably in a range of 3.15% by mass or more and 4.62% by mass or less, and more preferably in a range of 3.15% by mass or more and 4.20% by mass or less, still more preferably in a range of 3.15% by mass or more and 3.36% by mass or less, and particularly preferably in a range of 3.33% by mass or more and 3.36% by mass or less. Since the upper limit of the content of non-Ce rare earth elements contained in the catalyst layer with respect to 100% by mass of the catalyst layer is within the above range, the non-Ce rare earth elements contained in the catalyst layer hardly diffuses into an oxide film formed on the surface of the metal foil. If the diffusion of non-Ce rare earth elements contained in the catalyst layer into the oxide film on the surface of the metal foil can be inhibited, the volume expansion of the oxide film caused by the diffusion of the rare earth elements into the oxide film on the surface of the metal foil can be inhibited and foil elongation can be inhibited. When the foil elongation is occurred, the exhaust gas flow path becomes narrow and the back pressure rises, affecting the output of the engine. Further, when the foil elongation is large, the metal foil and the catalyst layer may be peeled off, and when the foil elongation is further increased, the metal foil forming the exhaust gas flow path may be separated from the mantle and the structural durability may be insufficient. On the other hand, according to the exhaust gas purifying catalyst structure of the present embodiment, the exhaust gas purifying catalyst structure provided with the catalyst layer described above enables to inhibit foil elongation, thereby contemplating to inhibit a reduction of engine output and improve structural durability.

Incidentally, the non-Ce rare earth element contained in the catalyst layer is preferably derived from the OSC material contained in the catalyst layer. By using the OSC material sin which the non-Ce rare earth element is contained, the heat resistance of the OSC material can be improved and the crystal strain can be increased to enable to improve the capability of absorbing and releasing oxygen. Further, when the non-Ce rare earth element is contained in the OSC material, the affinity between the OSC material and the specific noble metal is improved, and the specific noble metal can be selectively supported on the OSC material. The mass of the catalyst layer may be determined by measuring the mass of the catalyst layer of the exhaust gas purifying catalyst structure produced, or may be determined by measuring based on the amounts of materials used in producing the exhaust gas purifying catalyst structure. Further, the content of the non-Ce rare earth element in terms of an oxide may be determined based on the measurement of content ratio of the non-Ce rare earth elements in the produced exhaust gas purifying catalyst structure and then the mass in terms of an oxide from the measurement result, or it may be determined from the amount of oxides of non-Ce rare earth elements used in producing the exhaust gas purifying catalyst structure.

The content of the non-Ce rare earth element in the catalyst layer with respect to 100% by mass of the catalyst layer is in a range of 2.52% by mass or more and 4.62% by mass or less, preferably in a range of 3.15% by mass or more and 4.62% by mass or less, more preferably in a range of 3.15% by mass or more and 4.20% by mass or less, still more preferably in a range of 3.15% by mass or more and 3.36% by mass or less, and particularly preferably in a range of 3.33% by mass or more and 3.36% by mass or less.

Example of the non-Ce rare earth elements include scandium (Sc), yttrium (Y), lanthanum (La), praseodymium (Pr) neodymium (Nd), samarium (Sm), europium (Eu), gadolinium (Gd), terbium (Tb), dysprosium (Dy), holmium (Ho), erbium (Er), thulium (Tm), ytterbium (Yb) and lutetium (Lu). Among these, at least one rare earth element selected from the group consisting of neodymium (Nd), lanthanum (La), yttrium (Y) and praseodymium (Pr) is preferable, and at least one rare earth element selected from neodymium (Nd) and lanthanum (La) is more preferred. These non-Ce rare earth elements can improve the heat resistance of the OSC material or increase the crystal strain to improve the capability of absorbing and releasing of the OSC material. Further, the non-Ce rare earth element can strengthen the interaction with a specific noble metal and increase the affinity when supporting the noble metal on the OSC material, and can selectively support the specific noble metal, for example, rhodium (Rh) on the OSC material.

When the catalyst layer contains neodymium as the non-Ce rare earth element, the content of neodymium in terms of an oxide with respect to 100% by mass of the catalyst layer is preferably in a range of 1.48% by mass or more and 4.20% by mass or less, more preferably in a range of 2.10% by mass or more and 4.20% by mass or less, and still more preferably in a range of 2.10% by mass or more and 2.97% by mass or less. When neodymium is contained in the rare earth element and the content of neodymium is in the above range, the heat resistance and the capability of absorbing and releasing oxygen of the OSC material can be improved, and more effective affinity for a specific noble metal can be exhibited, on the other hand, neodymium does not diffuse into the oxide film on the surface of the metal foil, and the foil elongation of the metal foil on which the catalyst layer is supported can be inhibited.

When the catalyst layer contains lanthanum as the non-Ce rare earth element, the content of lanthanum in terms of an oxide with respect to 100% by mass of the catalyst layer is preferably in a range of 0.42% by mass or more and 1.23% by mass or less, more preferably in a range of 1.04% by mass or more and 1.13% by mass or less, still more preferably in a range of 1.05% by mass or more and 1.13% by mass or less, and even still more preferably in a range of 1.05% by mass or more and 1.10% by mass or less. When lanthanum is contained in the rare earth element and the content of lanthanum is within the above range, the heat resistance and the capability of absorbing and releasing oxygen of the OSC material can be improved, and the effective affinity for noble metals can be exhibited, on the other hand, the lanthanum does not diffuse into the oxide film on the surface of the metal foil, and the foil elongation of the metal foil on which the catalyst layer is supported can be inhibited.

The ratio of the content (% by mass) of the non-Ce rare earth element in the catalyst layer to the content (% by mass) of Al in the metal foil (non-Ce rare earth element/Al) is preferably 0.2 or more and 1.1 or less, more preferably in the range of 0.3 or more and 1.0 or less, still more preferably 0.4 or more and 0.9 or less, even still more preferably in the range of 0.46 or more and 0.84 or less, and particularly preferably in the range of 0.57 or more and 0.76 or less. When the ratio of the content by mass of the non-Ce rare earth element in the catalyst layer to the content (% by mass) of Al in the metal foil is in the above range, the non-Ce rare earth element contained in the catalyst layer hardly diffuses into the oxide film formed on the surface of the metal foil, which can inhibit the foil elongation.

OSC Material

The OSC material preferably contains a co-catalyst having an oxygen storage capacity (OSC), and can be a support of a noble metal having a catalytic ability. As the OSC material, a material containing cerium and a rare earth element other than cerium (non-Ce rare earth element) is used, and example thereof can include a material in which the non-Ce rare earth element is further contained in a porous body such as cerium oxide or a ceria-zirconia composite oxide. The OSC material contains the non-Ce rare earth elements in order to improve heat resistance and the capability of absorbing and releasing oxygen. The non-Ce rare earth element is preferably at least one rare earth element selected from the group consisting of neodymium (Nd), lanthanum (La), yttrium (Y) and praseodymium (Pr), and more preferably at least one rare earth element selected from neodymium (Nd) and lanthanum (La). At least one non-Ce rare earth element is preferably contained in the OSC material, and two or more non-Ce rare earth elements may be contained in the OSC material.

The content of the non-Ce rare earth element contained in the OSC material with respect to 100% by mass of the total amount of the OSC material is preferably 1.0% by mass or more and 12.0% by mass or less, more preferably 1.5% by mass or more and 11.0% by mass or less, and still more preferably 2.0% by mass or more and 10.0% by mass or less. When the non-Ce rare earth element contained in the OSC material is 1.0% by mass or more with respect to 100% by mass of the total amount of the OSC material, the heat resistance and the capability of absorbing and releasing oxygen of the OSC material are improved, the effective affinity to a specific noble metal can be further exhibited, and a specific noble metal can be selectively supported on the OSC material. On the other hand, when the non-Ce rare earth element contained in the OSC material is 12.0% by mass or less, it is possible to inhibit the non-Ce rare earth element from diffusing from the catalyst layer into the oxide film on the surface of the metal foil, which enables to further inhibit the foil elongation. The content of non-Ce rare earth elements contained in the OSC material refers to the total amount of each rare earth element when two or more non-Ce rare earth elements are contained. When the non-Ce rare earth element contained in the OSC material is neodymium, the content of neodymium relative to 100% by mass of the total amount of the OSC material is preferably 1.0% by mass or more and 12.0% by mass or less, more preferably 2.0% by mass or more and 11.0% by mass or less, and still more preferably 3.0% by mass or more and 10.0% by mass or less. The non-Ce rare earth element contained in the OSC material may or may not contain lanthanum. When the non-Ce rare earth element contained in the OSC material is lanthanum, the content of the lanthanum relative to 100% by mass of the total amount of the OSC material is preferably 0.1% by mass or more and 3.0% by mass or less, more preferably 0.2% by mass or more and 2.5% by mass or less, and still more preferably 0.3% by mass or more and 2.0% by mass or less.

The average particle size (D50) of the OSC material is preferably 3 μm or more and 12 μm or less. The average particle size (D50) of the OSC material of 3 μm or more and 12 μm or less, facilitates adhesion to the metal foil and facilitates the purifying performance to be ensured. From this point of view, the average particle size (D50) of the OSC material is more preferably 4 μm or more and 9 μm or less. In the present description, the average particle size (D50) of the OSC material and the average particle size (D50) of alumina described later refer to 50% volume particle diameters each obtained by integrating the diameter from the small diameter side in the volume-based particle size distribution by a laser diffraction scattering type particle size distribution measurement method.

Alumina

The catalyst layer preferably contains alumina as an inorganic porous body that supports a noble metal. The alumina contained in the catalyst layer may be alumina per se or an inorganic porous body containing alumina as a main component. Examples of the inorganic porous body containing alumina as a main component include at least one inorganic porous body selected from the group consisting of silica-alumina, aluminosilicates, alumina-zirconia, alumina-chromia, alumina-ceria, alumina-magnesium oxide, alumina-barium oxide, and alumina-lanthanum oxide. The catalyst layer may contain alumina and two or more inorganic porous bodies other than alumina. Alumina has a high specific surface area and can support a noble metal such as palladium (Pd) in a dispersed form. On the other hand, when rhodium (Rh) is supported on alumina, rhodium (Rh) that is a metal relatively prone to oxidation reacts with alumina to irreversibly produce a rhodium compound, which may deteriorate purifying performance of rhodium (Rh). Therefore, alumina preferably supports, for example, palladium (Pd) other than rhodium (Rh) among the noble metals.

The average particle size (D50) of alumina is preferably 5 μm or more and 25 μm or less. When the average particle size (D50) of alumina is 5 μm or more and 25 μm or less, the diffusivity of the exhaust gas in the layer can be improved to be more excellent in the exhaust gas purifying performance, which can further improve the adhesion between the metal support and the catalyst layer.

From this point of view, the average particle size (D50) of alumina is more preferably 7 μm or more and 22 μm or less, and still more preferably 10 μm or more and 20 μm or less. For commercially available products, the catalog values can be adopted.

Incidentally, from the viewpoint of improving the heat resistance of the catalyst layer, alumina may contain lanthanum oxide ($La_2O_3$). On the other hand, if the content proportion of lanthanum oxide in alumina is too large, the specific surface area of alumina becomes small, and from the viewpoint that the dispersibility of noble metals such as palladium (Pd) supported on alumina may decrease, the content proportion of lanthanum oxide in alumina is preferably 1.2% by mass or less, and more preferably 1.0% by mass or less.

Mixing Ratio of OSC Material and Alumina

In order to support individual noble metals to improve the dispersibility of the noble metals and inhibit alloying of two different noble metals, the mixing ratio of the OSC material and alumina, which is defined as a mass ratio of OSC material to alumina (OSC material/alumina), where the mass ratio of the OSC material is a ratio, when alumina is 1, of preferably 0.2 or more and 4 or less, more preferably 0.3 or more and 3 or less, and still more preferably 0.5 or more and 2 or less.

Noble Metal

The noble metal preferably contains palladium (Pd) and rhodium (Rh). Palladium (Pd) is a metal having a high ability to catalyze the oxidation reaction of hydrocarbon (HC) and carbon monoxide (CO). On the other hand, palladium (Pd) is easily alloyed with rhodium (Rh). When palladium (Pd) and rhodium (Rh) are alloyed, the catalytic performance deteriorates. Therefore, palladium (Pd) and rhodium (Rh) are preferably supported on individual supports, respectively, and palladium (Pd) is preferably supported on alumina or an inorganic porous body containing alumina as a main material. Rhodium (Rh) is a metal having a high ability to catalyze the reduction reaction of NOx. On the other hand, rhodium (Rh) is a metal that is relatively prone to oxidization, it is preferably supported on the OSC material because when rhodium (Rh) is supported on alumina as described above, rhodium (Rh) that is a metal relatively prone to oxidization reacts with alumina to irreversibly produce a rhodium (Rh) compound, reducing the catalytic performance of rhodium (Rh). The noble metal may contain platinum (Pt), silver (Ag), gold (Au), ruthenium (Ru), osmium (Os), and iridium (Ir) in addition to palladium (Pd) and rhodium (Rh).

The mass ratio of palladium (Pd) to rhodium (Rh) contained in the catalyst layer (Pd/Rh) is preferably 0.2 or more and 1.8 or less, more preferably 0.3 or more and 1.7 or less, and still more preferably 0.4 or more and 1.6 or less, in terms of a metal in order to exhibit the catalytic ability of the noble metal and support them on individual supports. The total amount of palladium (Pd) and rhodium (Rh) supported on the catalyst layer is preferably 0.1 g or more and 2.0 g or less per 1 L of the volume of the metal support in terms of a metal and more preferably 0.2 g or more and 1.9 g or less.

Other Components

The catalyst layer may contain a stabilizer, if necessary. Examples of the stabilizer include at least one element selected from the group consisting of alkaline earth metals and alkali metals, boron, silicon, hafnium, thorium. The catalyst layer can contain at least one element selected from the group consisting of magnesium, barium, boron, thorium, hafnium, silicon, calcium and strontium, as the stabilizer.

The catalyst layer may contain a binder, if necessary. As the binder component, a water-soluble solution of an inorganic binder, for example, an alumina sol, silica sol, or zirconia sol, can be used.

The catalyst layer can be formed, for example, by the method for producing the exhaust gas purifying device described later involving attaching a slurry containing the noble metal, the OSC material containing cerium and the non-Ce rare earth element, and alumina to the metal support by wash coating, etc., and drying it.

Method for Producing Exhaust Gas Purifying Catalyst Structure

An example of the embodiment of the present invention is a method for producing an exhaust gas purifying catalyst structure, comprising: a step of adding alumina to a solution comprising a first noble metal, supporting the first noble metal on alumina which results in alumina supporting the first noble metal to form a first slurry comprising the alumina supporting the first noble metal, adding an OSC material comprising cerium and non-cerium rare earth element and a solution comprising a second noble metal to the first slurry in this order, and supporting the second noble metal on the OSC material to form a second slurry further comprising the OSC material supporting the second noble metal; and a step of attaching the second slurry to a metal support configured by using an mantle and a metal foil provided inside the mantle and forming an exhaust gas flow path to form a catalyst layer, wherein the catalyst layer contains the non-Ce rare earth element in a content with respect to 100% by mass of the catalyst layer of 2.52% by mass or more and 4.62% by mass or less in terms of an oxide.

By adding alumina to the solution containing the first noble metal, the first noble metal is dispersed and supported on the alumina having a high specific surface area, and the first slurry containing the alumina supporting the first noble metal is formed. Next, when the OSC material containing cerium and the non-Ce rare earth element and the solution containing the second noble metal are added to the first slurry in this order, the second noble metal is selectively supported on the OSC material due to affinity between the non-Ce rare earth element contained in the OSC material and the second noble metal to form the second slurry further containing the OSC material supporting the second noble metal. According to this production method, in a series of steps of forming the second slurry from the first slurry, the first noble metal and the second noble metal are supported on different supports of alumina and an OSC material, respectively. Namely, in one step, the first noble metal and the second noble metal can be supported on the alumina and the OSC material that are different supports from each other. As a result, it is possible to inhibit the alloying of two different noble metals that occurs when two noble metals are supported on one support, and deterioration of the catalytic performance can be inhibited. Further, it is not necessary to support the two noble metals on different supports in advance, and the first noble metal can be selectively supported on the alumina and the second noble metal can be selectively supported on the OSC material in one step, from which the production steps can be reduced and the production cost can be maintained low.

The first noble metal is preferably palladium (Pd), and the second noble metal is preferably rhodium (Rh). When the first noble metal is palladium (Pd), palladium (Pd) can be dispersed and supported on alumina having a high specific surface area, and then when the second noble metal is rhodium (Rh), rhodium (Rh) can be selectively supported on the OSC material due to the affinity between the non-Ce rare earth element contained in the OSC material and rhodium (Rh) that is the second noble metal. When palladium (Pd) that is the first noble metal can be selectively supported on alumina and rhodium (Rh) that is the second noble metal can be selectively supported on the OSC material, a single-layer catalyst layer can be formed without deteriorating the catalytic performance of each noble metal, which enables to reduce the production steps and production cost.

The slurry produced in one step can be attached to the metal support by a method such as wash coating as in the conventional method, and this can be dried or calcinated to form a catalyst layer.

Further, the drying temperature following coating of the slurry is preferably, for example, 50° C. or higher and 150° C. or lower and in particular 70° C. or higher and 120° C. or lower.

The catalyst layer can inhibit the diffusion of the non-Ce rare earth element contained in the catalyst layer to the oxide film on the surface of the metal foil by forming the catalyst layer such that the content of the non-Ce rare earth element with respect to 100% by mass of the catalyst layer is in a range of 2.52% by mass or more and 4.62% by mass or less in terms of an oxide, preferably in a range of 3.15% by mass or more and 4.62% by mass or less, more preferably in a range of 3.15% by mass or more and 4.20% by mass or less, even still more preferably in a range of 3.15% by mass or more and 3.36% by mass or less, and particularly preferably in a range of 3.33% by mass or more and 3.36% by mass or less. Therefore, the volume expansion of the oxide film caused by the non-Ce rare earth element diffused in the oxide film on the surface of the metal foil can be inhibited, and the foil elongation can be inhibited. The content of the non-Ce rare earth element in the catalyst layer with respect to 100% by mass of the catalyst layer is in a range of 2.52% by mass or more and 4.62% by mass or less in terms of an oxide, preferably in the range of in a range of 3.15% by mass or more and 4.62% by mass or less, more preferably in a range of 3.15% by mass or more and 4.20% by mass or less, even still more preferably in a range of 3.15% by mass or more and 3.36% by mass or less, and particularly preferably in a range of 3.33% by mass or more and 3.36% by mass or less.

Any publicly known method can be employed for the method of attachment of the slurry and the method for drying or calcinating the slurry to form the catalyst layer in order to produce the exhaust gas purifying catalyst structure, and these methods are not limited to the above examples.

Application

The exhaust gas purifying catalyst structure can be suitably used for purifying an exhaust gas discharged from an internal combustion engine of four-wheeled vehicles or saddle-ridden type vehicles such as motorcycles.

Among them, the effect can be exhibited even more effectively by arranging the exhaust gas purifying catalyst structure in an exhaust passage of an internal combustion engine of, for example, a saddle-ridden type vehicle. For example, one or a plurality of exhaust gas purifying devices provided with the exhaust gas purifying catalyst structure can be arranged inside an exhaust pipe or a muffler. In this case, the exhaust gas purifying device reacts with elevated-temperature combustion gas to promote a chemical reaction (oxidation/reduction action), and therefore, the catalyst is preferably arranged directly under the exhaust port having a high exhaust gas temperature.

An example of saddle-ridden type vehicles suitable for mounting the exhaust gas purifying device provided with the exhaust gas purifying catalyst structure can include a saddle-ridden type vehicle in combination of a carburetor and a secondary air supply mechanism, set to have an air-fuel ratio of the exhaust gas flowing in the exhaust passage so as to be 14 or more (in particular 14.5 or more).

When a secondary air supply mechanism in which a reed valve that operates corresponding to the exhaust pressure is used, is employed as the secondary supply mechanism, usually, the supply amount of the secondary air is reduced, facilitating a reductive atmosphere, if the negative region in the exhaust pulsation falls in a low engine revolution condition or in loading state, and if this reductive atmospheric state is continued, the catalytic performance becomes unstable. However, if the air-fuel ratio of the exhaust gas flowing in the exhaust passage is set to be 14 or more by combining the carburetor and the secondary air supply mechanism, the catalytic performance can be stably exhibited.

Example of the exhaust gas purifying device suitable for setting the air-fuel ratio of the exhaust gas flowing in the exhaust passage to be 14 or more by combining the carburetor and the secondary air supply mechanism, can include an exhaust gas purifying device provided with an air cleaner having a dirty side and a clean side and purifying air taken in from the outside to the dirty side to supply it to an engine via the clean side, and a secondary air supply mechanism that supplies a secondary air from the clean side of the air cleaner to the exhaust port side of the engine, and therefore the exhaust gas purifying catalyst is effectively arranged in the exhaust passage of the internal combustion engine.

For example, the exhaust gas purifying device shown in FIG. 1 can be exemplified.

An exhaust gas purifying device 10 shown in FIG. 1 is ridden on a saddle-ridden type vehicle in which fuel is mixed with an air supplied from an air cleaner 11 to an engine (internal combustion engine) 12 at a carburetor 13, and it is provided with a secondary air supply mechanism 20 for supplying a secondary air (purified air) from the air cleaner 11 to an exhaust port 12B of an engine 12 and an exhaust muffler 15 connected to the engine 12 via an exhaust pipe 14, and therefore the exhaust gas purifying catalyst structure can be installed in the exhaust muffler 15. Incidentally, in FIG. 1, arrow X indicates a flow of air, arrow Y indicates a vacuum pressure, and arrow Z indicates a flow of blow-by gas generated in the crankcase.

As shown in FIG. 1, the inside of an air cleaner case 11A is divided into two chambers that are a dirty side (outside air introduction chamber) 11C and a clean side (clean air chamber) 11D, by a partition wall 11B. The dirty side 11C is provided with an outside air introduction port 11E, and an outside air is introduced into the dirty side 11C through the outside air introduction port 11E. A filter element 11F is arranged on the partition wall 11B so as to cover an opening communicating the dirty side 11C and the clean side 11D, and the air in the dirty side 11C passes through the filter element 11F and is purified, and then introduced to the clean side 11D. The clean side 11D is provided with an air discharge port 11G, which is connected to a carburetor 13 via a connecting tube 16 and communicates with an intake port 12A of the engine 12 via the carburetor 13.

The engine 12 is a general two-cycle engine or four-cycle engine ridden on a motorcycle, etc., and is provided with an intake valve 12D that opens and closes the intake port 12A communicating with a cylinder hole (cylinder) 12C in the engine 12 and an exhaust valve 12E that opens and closes the exhaust port 12B communicating with the cylinder hole 12C, and a piston 12F slidably arranged in the cylinder hole 12C is connected to a crank shaft 12H via a conrod 12G. In the intake step where the piston 12F is lowered (the exhaust valve 12E is closed) while the intake valve 12D of the engine 12 being open, the air in the clean side 11D of the air cleaner 11 is sucked into the part above the piston 12F of the cylinder hole 12C through the carburetor 13 due to the negative pressure on the engine 12 side caused by the descent of the piston 12F, at the same time the fuel is supplied from the carburetor 13, and a mixture of fuel and air is supplied to the engine 12. Subsequently, after general compression step and combustion step of a 4-cycle engine, the exhaust step in which the piston 12F rises with the exhaust valve 12E being open (the intake valve 12D is closed) is carried out, and then the combustion gas is discharged to the exhaust port 12B and discharged to the exhaust pipe 14 as exhaust gas. The exhaust muffler 15 is connected to the rear end of the exhaust pipe 14, and the exhaust muffler 15 functions as a silencer that silences elevated-temperature and high-pressure exhaust gas that has passed through the exhaust pipe 14 and discharges the exhaust gas to the outside.

In FIG. 1, the exhaust muffler 15 is configured as a multi-stage expansion type in which the exhaust muffler 15 is divided into a plurality of chambers by a plurality of partition walls 15A and 15B, and each chamber is communicated with a communication pipe 15C, 15D, and 15E, and then, an exhaust gas purifying catalyst structure 30 containing the catalyst may be arranged in the front chamber located in the most upstream side.

The secondary air supply mechanism 20 is a mechanism for sending the air (secondary air) of the clean side 11D of the air cleaner 11 to the exhaust port 12B of the engine 12, and is provided with a secondary air supply pipe 21 that connects the clean side 11D of the air cleaner and the exhaust port 12B of the engine 12. A valve unit 22 is arranged in the middle of the secondary air supply pipe 21, and a reed valve 23 for preventing the exhaust gas from flowing back from the exhaust port 12B to the secondary air supply pipe 21 is arranged between the valve unit 22 and the exhaust port 12B. Incidentally, FIG. 1 shows a state in which the reed valve 23 is arranged above the engine 12 that is located closer to the exhaust port 12B, from the viewpoint of improving the followability of the reed valve 23.

The valve unit 22 is provided with a secondary air supply control valve 24 that prevents the supply of secondary air to the exhaust port 12B when the engine is decelerated, and the secondary air supply control valve 24 is configured so as to operate in response to the vacuum pressure of the intake port 12A, which is transmitted via a communication pipe 25 connecting the intake port 12A of the engine 12 and the valve unit 22. Moreover, a sign 35 in the FIGURE indicates the communication pipe that communicates the clean side 11D of the air cleaner 11 and the crankcase of the engine 12. The communication pipe 35 functions as a crankcase emission control device that returns the blow-by gas generated in the crankcase to the engine 12 through the air cleaner 11 and the carburetor 13 to prevent the release of the blow-by gas.

Generally, when using the carburetor 13, the air-fuel ratio is set to a rich side in order to smoothly follow an acceleration request from a driver, which facilitates the oxygen concentration in the exhaust gas to be lowered. Therefore, it is preferred that the purifying function is stabilized by employing the secondary air supply mechanism 20 to increase the oxygen concentration in the exhaust gas, and for example, the secondary air supply mechanism 20 and the carburetor 13 are set so that at least the durable mileage of the exhaust gas regulation set in some countries (mileage while maintaining the state of the exhaust gas regulation value or smaller) is satisfied.

The air-fuel ratio at the catalyst inlet can be set to be 15 or more in the entire region of 55 km/h or less by adjusting and improving the aforementioned carburetor 13 and secondary air supply mechanism 20 to change the catalyst inlet air-fuel ratio. Accordingly, even when a relatively low-cost carburetor is used in a small vehicle, deterioration of the durability of the catalyst can be inhibited within the required level of exhaust gas regulations while avoiding poor drivability due to a thin air-fuel ratio, which can stabilize the performance of the catalyst for a long period of time.

Explanation of Terms

In the present description throughout, the term "saddle-ridden type vehicle" encompasses not only saddle-ridden type two-wheel vehicles, saddle-ridden type three-wheel vehicles, and saddle-ridden type four-wheel vehicles, which are generally referred to as saddle-ridden type vehicles, but also scooter type motorcycles.

Moreover, when expressed as "X or more" (X is an arbitrary number) or "Y or less" (Y is an arbitrary number) in the present description, it is contemplated to encompass "preferably larger than X" or "preferably less than Y".

EXAMPLES

Hereinafter, the present invention will be described in more detail by way of Examples and Comparative Examples. The present invention is not limited to these examples.

Example 1

Ceria-zirconia composite oxide as OSC material ($Nd_2O_3$: 5.3% by mass, $CeO_2$: 21% by mass, $ZrO_2$: 72% by mass, $La_2O_3$: 1.7% by mass, and average particle size (D50) of 8 μm), alumina ($Al_2O_3$: 99.0% by mass, $La_2O_3$: 1.0% by mass, and average particle size (D50) of 15 μm), and a zirconia sol as an inorganic binder, were prepared, respectively.

The metal support that was a stainless steel metal honeycomb support (300 cells/inch$^2$, φ40 mm×L90 mm, capacity of 113 ml, Al content of 5.5% by mass and metal foil thickness of 50 μm) containing aluminum (Al) and provided with an mantle made of stainless steel and a flat metal foil and a corrugated metal foil, was calcinated at 500° C. for 1 hour to remove oil and dust adhering to the metal support.

Pure water was added to a Pd nitrate aqueous solution, 42 parts by mass of the above alumina was added thereto, and the mixture was stirred for 2 hours to form a first slurry containing alumina supporting Pd, and then 42 parts by mass of the aforementioned ceria-zirconia composite oxide was added to the first slurry, and next, by adding a Rh nitrate aqueous solution and further adding 12 parts by mass of the binder material, a second slurry for forming the catalyst layer was obtained. Incidentally, the total content proportion of Pd, Rh and other components contained in the second slurry for forming the catalyst layer was 4 parts by mass. Other components include barium added to the second slurry as a stabilizer.

Next, after the stainless steel metal honeycomb metal support was immersed in the second slurry for forming the aforementioned catalyst layer, the metal support was removed of the excess slurry in the cell by air blowing, dried, and then calcinated at 500° C. for 1 hour in the air atmosphere to form a catalyst layer and to obtain an exhaust gas purifying catalyst structure (hereinafter, also referred to as "catalyst structure"). The solid content (wash coat amount (WC amount)) of the second slurry attaching to the metal support was 90 g per 1 L of the volume of the catalyst structure (volume of the metal support).

In the prepared catalyst structure, the amount of Pd supported was 8 g per cubic feet (cft) of the volume of the catalyst structure in terms of a metal, and the amount of Rh supported was 6 g per cubic feet (cft) of the volume of the catalyst structure in terms of a metal, and the mass ratio of Pd/Rh was 1.33.

In Table 1, the mass of the catalyst layer, the content of non-Ce rare earth element oxide in the catalyst layer, the content of $Nd_2O_3$ in the catalyst layer, the content of $La_2O_3$ in the catalyst layer, and the content of the non-Ce rare earth element in the catalyst layer with respect to the Al content in the metal foil were each calculated from the amount used.

Example 2

A catalyst structure was prepared in the same manner as in Example 1 except that a ceria-zirconia composite oxide having a different composition ($Nd_2O_3$: 10% by mass, $CeO_2$: 30% by mass, $ZrO_2$: 60% by mass, and the average particle size (D50) of 8 μm), was used, instead of the ceria-zirconia composite oxide used in Example 1.

Example 3

A catalyst structure was prepared in the same manner as in Example 1 except that a ceria-zirconia composite oxide having a different composition ($Nd_2O_3$: 5% by mass, $CeO_2$: 5% by mass, $ZrO_2$: 88.5% by mass, $La_2O_3$: 1.5% by mass and the average particle size (D50) of 8 μm), was used, instead of the ceria-zirconia composite oxide used in Example 1.

Example 4

A catalyst structure was prepared in the same manner as in Example 1 except that the addition amounts of the Pd nitrate aqueous solution and the Rh aqueous solution were adjusted such that the amount of Pd supported was 8.6 g per cubic feet (cft) of the volume of the catalyst structure in terms of a metal, and the amount of Rh supported was 5.4 g per cubic feet (cft) of the volume of the catalyst structure in terms of a metal.

Example 5

A catalyst structure was prepared in the same manner as in Example 1 except that the addition amounts of the Pd nitrate aqueous solution and the Rh aqueous solution were adjusted such that the amount of Pd supported was 7 g per cubic feet (cft) of the volume of the catalyst structure in terms of a metal, and the amount of Rh supported was 7 g per cubic feet (cft) of the volume of the catalyst structure in terms of a metal.

Example 6

A catalyst structure was prepared in the same manner as in Example 1 except that the addition amounts of the Pd nitrate aqueous solution and the Rh aqueous solution were adjusted such that the amount of Pd supported was 4.7 g per cubic feet (cft) of the volume of the catalyst structure in terms of a metal, and the amount of Rh supported was 9.3 g per cubic feet (cft) of the volume of the catalyst structure in terms of a metal.

Example 7

A catalyst structure was prepared in the same manner as in Example 1 except that the amount of alumina used was changed to 28 parts by mass and the amount of the above ceria-zirconia composite oxide used was changed to 56 parts by mass.

Example 8

A catalyst structure was prepared in the same manner as in Example 1 except that the amount of alumina used was changed to 56 parts by mass and the amount of the above ceria-zirconia composite oxide used was changed to 28 parts by mass.

Example 9

A catalyst structure was prepared in the same manner as in Example 1 except that the addition amounts of the Pd nitrate aqueous solution and the Rh aqueous solution were adjusted such that the amount of Pd supported was 24 g per cubic feet (cft) of the volume of the catalyst structure in terms of a metal, and the amount of Rh supported was 18 g per cubic feet (cft) of the volume of the catalyst structure in terms of a metal, and the amount of alumina used was changed to 39 parts by mass.

Comparative Example 1

A catalyst structure was prepared in the same manner as in Example 1 except that a ceria-zirconia composite oxide having a different composition ($Nd_2O_3$: 15% by mass, $CeO_2$: 15% by mass, $ZrO_2$: 70% by mass, and the average particle size (D50) of 8 μm), was used, instead of the ceria-zirconia composite oxide used in Example 1.

Comparative Example 2

A catalyst structure was prepared in the same manner as in Example 1 except that a ceria-zirconia composite oxide having a different composition ($CeO_2$: 30% by mass, $ZrO_2$: 70% by mass, and the average particle size (D50) of 8 μm), was used, instead of the ceria-zirconia composite oxide used in Example 1.

Comparative Example 3

A catalyst structure was prepared in the same manner as in Example 1 except that the amount of alumina used was changed to 84 parts by mass and the ceria-zirconia composite oxide was not added.

Comparative Example 4

A catalyst structure was prepared in the same manner as in Comparative Example 3 except that the solid content (WC amount) of the second slurry to be attached to the above stainless steel metal honeycomb support was changed to 150 g per 1 L of the volume of the catalyst structure (volume of the metal support).

Comparative Example 5

First, pure water was added to a Pd nitrate aqueous solution, and 84.3 parts by mass of the alumina used in Example 1 and 12 parts by mass of the binder material used in Example 1 were further added to obtain a slurry for forming a lower layer. Incidentally, the content proportion of the total of Pd and other components contained in the slurry for forming the lower layer was 3.7 parts by mass.

On the other hand, pure water was added to the Rh nitrate aqueous solution, and 87.7 parts by mass of the above alumina and 12 parts by mass of the above binder material were further added to obtain a slurry for forming an upper layer. The content proportion of the total of Rh and other components contained in the slurry for forming the upper layer was 0.3 parts by mass.

In Table 1, regarding the upper layer and the lower layer as one catalyst layer, the mass of the catalyst layer, the content of oxides of non-Ce rare earth elements in the catalyst layer, the content of $La_2O_3$ in the catalyst layer, and the content of the non-Ce rare earth element in the catalyst layer with respect to the Al content in the metal foil, were each calculated from the amount used.

Foil Elongation Resistance

The catalyst structures of Examples 1 to 9 and Comparative Examples 1 to 5 were each incorporated into a muffler of a gasoline engine and subjected to durability treatment under the following conditions. Then, the amount of the foil elongation after the durability treatment was measured, and the foil elongation resistance was evaluated according to the following criteria. Incidentally, the amount of the foil elongation was determined from the difference in the lengths in the axial direction of the metal honeycomb support before and after the durability treatment.

<Durability Treatment>
 Gasoline engine: Displacement 2,300 cc
 Fuel: Unleaded gasoline
 Thermal durability condition: 850° C.×64 hours (repeated cycle of changing A/F at 12.5 (12 seconds), 14.6 (42 seconds), 20.0 (6 seconds))
 Poisoning durability condition: 700° C.×6 hours (durability using blended gasoline containing lubricating oil)

<Criteria>
 A: The elongation amount of the foil after the durability treatment was 1.0 mm or less.
 B: The elongation amount of the foil after the durability treatment was more than 1.0 mm.

Purifying Performance of CO, HC and NOx

The catalyst structure having been subjected to the aforementioned durability treatment of foil elongation resistance was incorporated into a muffler of a motorcycle having the basic configuration shown in FIG. 1 in a state where secondary air was cut off, and the actual vehicle purifying performance of the catalyst structure was evaluated by measuring the total amount of emission amounts of CO, HC and NOx under the following conditions, respectively. The results are shown in Table 1. Incidentally, the CO emission amount indicated in Table 1, was $\frac{1}{10}$ times as small as the original value.

Vehicle used: Single-cylinder 125 cc motorcycle
 Fuel: Unleaded gasoline
 Driving mode: WMTC
 Measurement method: Compliant with ISO6460

TABLE 1

| | | | | | Catalyst layer | | | | | |
| | | | | | | OSC | | Pd + Rh (+other | | OSC material | |
| | Layer structure | Pd [g/cft] | Rh [g/cft] | Pd/Rh | $Al_2O_3$ [parts by mass] | material (parts by mass) | Binder [parts by mass] | components) (parts by mass) | WC amount [g/L] | $Nd_2O_3$ [% by mass] | $CeO_2$ [% by mass] |
|---|---|---|---|---|---|---|---|---|---|---|---|
| Example 1 | One layer | 8 | 6 | 1.33 | 42 | 42 | 12 | 4 | 90 | 5.3 | 21 |
| Example 2 | One layer | 8 | 6 | 1.33 | 42 | 42 | 12 | 4 | 90 | 10 | 30 |
| Example 3 | One layer | 8 | 6 | 1.33 | 42 | 42 | 12 | 4 | 90 | 5 | 5 |
| Example 4 | One layer | 8.6 | 5.4 | 1.59 | 42 | 42 | 12 | 4 | 90 | 5.3 | 21 |
| Example 5 | One layer | 7 | 7 | 1.00 | 42 | 42 | 12 | 4 | 90 | 5.3 | 21 |
| Example 6 | One layer | 4.7 | 9.3 | 0.51 | 42 | 42 | 12 | 4 | 90 | 5.3 | 21 |
| Example 7 | One layer | 8 | 6 | 1.33 | 28 | 56 | 12 | 4 | 90 | 5.3 | 21 |
| Example 8 | One layer | 8 | 6 | 1.33 | 56 | 28 | 12 | 4 | 90 | 5.3 | 21 |
| Example 9 | One layer | 24 | 18 | 1.33 | 39 | 42 | 12 | 7 | 90 | 5.3 | 21 |
| Comparative Example 1 | One layer | 8 | 6 | 1.33 | 42 | 42 | 12 | 4 | 90 | 15 | 15 |
| Comparative Example 2 | One layer | 8 | 6 | 1.33 | 42 | 42 | 12 | 4 | 90 | 0 | 30 |
| Comparative Example 3 | One layer | 8 | 6 | 1.33 | 84 | 0 | 12 | 4 | 90 | 0 | 0 |
| Comparative Example 4 | One layer | 8 | 6 | 1.33 | 84 | 0 | 12 | 4 | 150 | 0 | 0 |
| Comparative Example 5 | Lower layer | 8 | — | — | 84.3 | 0 | 12 | 3.7 | 80 | 0 | 0 |
| | Upper layer | 0 | 6 | — | 87.7 | 0 | 12 | 0.3 | 70 | | |

TABLE 1-continued

|  | OSC material | | Content of oxide non-Ce rare earth element in catalyst layer [% by mass] | $Nd_2O_3$ content in catalyst layer [% by mass] | $La_2O_3$ content in catalyst layer [% by mass] | Oxide of non-Ce rare earth element in catalyst layer/Al in metal foil | Evaluation | | | |
|---|---|---|---|---|---|---|---|---|---|---|
|  | $ZrO_2$ [% by mass] | $La_2O_3$ [% by mass] |  |  |  |  | 1/10 CO Emission amount [mg/km] | HC Emission amount [mg/km] | NOx Emission amount [mg/km] | Foil elongation resistance |
| Example 1 | 72 | 1.7 | 3.36 | 2.23 | 1.13 | 0.61 | 151 | 183 | 53 | A |
| Example 2 | 60 | 0 | 4.62 | 4.20 | 0.42 | 0.84 | 146 | 185 | 56 | A |
| Example 3 | 88.5 | 1.5 | 3.15 | 2.10 | 1.05 | 0.57 | 160 | 195 | 60 | A |
| Example 4 | 72 | 1.7 | 3.36 | 2.23 | 1.13 | 0.61 | 156 | 190 | 63 | A |
| Example 5 | 72 | 1.7 | 3.36 | 2.23 | 1.13 | 0.61 | 152 | 178 | 54 | A |
| Example 6 | 72 | 1.7 | 3.36 | 2.23 | 1.13 | 0.61 | 157 | 185 | 64 | A |
| Example 7 | 72 | 1.7 | 4.20 | 2.97 | 1.23 | 0.76 | 153 | 191 | 62 | A |
| Example 8 | 72 | 1.7 | 2.52 | 1.48 | 1.04 | 0.46 | 150 | 196 | 61 | A |
| Example 9 | 72 | 1.7 | 3.33 | 2.23 | 1.10 | 0.61 | 145 | 172 | 19 | A |
| Comparative Example 1 | 70 | 0 | 6.72 | 6.30 | 0.42 | 1.22 | 161 | 184 | 46 | B |
| Comparative Example 2 | 70 | 0 | 0.42 | — | 0.42 | 0.08 | 162 | 197 | 68 | A |
| Comparative Example 3 | 0 | 0 | 0.84 | — | 0.84 | 0.15 | 161 | 196 | 84 | A |
| Comparative Example 4 | 0 | 0 | 0.84 | — | 0.84 | 0.15 | 164 | 211 | 71 | A |
| Comparative Example 5 | 0 | 0 | 0.86* | — | 0.86* | 0.16 | 156 | 199 | 75 | A |

*For Comparative Example 5, the oxide content in the catalyst layer was calculated considering the upper layer and lower layer as one catalyst layer.

The exhaust gas purifying catalyst structures of Examples 1 to 9 each have the content of the non-Ce rare earth element contained in the catalyst layer that is in the range of 2.52% by mass or more and 4.62% by mass or less in terms of an oxide, inhibit the foil elongation and have the structure durability. Further, even when the exhaust gas purifying catalyst structures of Examples 1 to 9 each have the catalyst layer that is one layer, palladium (Pd) is supported on alumina and rhodium (Rh) is supported on the OSC material, which therefore inhibit the alloying of two different noble metals that are palladium and rhodium, and the exhaust gas purifying catalyst structures have maintained excellent exhaust gas purifying performance.

The exhaust gas purifying catalyst structure of Comparative Example 1 had the greater content of the non-Ce rare earth element contained in the catalyst layer that is more than 4.62% by mass in terms of an oxide, causing the foil elongation and decreasing the structural durability. The exhaust gas purifying catalyst structure of Comparative Example 2 does not contain non-Ce rare earth elements in the OSC material, therefore, palladium and rhodium are assumed not to be selectively supported on the alumina and the OSC material separately and respectively, to bring about the alloying of palladium and rhodium, and therefore it decreased the catalyst performance compared with the case of using the exhaust gas purifying catalyst structure of Comparative Example 1, and increased the emission amounts of CO, HC and NOx in the exhaust gas. Further, the exhaust gas purifying catalyst structures of Comparative Examples 3 and Comparative Examples 4 each in which the OSC material serving as the promoter was not contained, and both palladium and rhodium were supported on alumina that was one type of support to cause the alloying of palladium and rhodium, resulted in exhibiting deteriorated catalytic performance. The exhaust gas purifying catalyst structure of Comparative Example 5 exhibited deteriorated catalyst performance because the OSC material serving as the promoter was not contained. Moreover, the exhaust gas purifying catalyst structure of Comparative Example 5 having the catalyst layer consisting of the two-layer structure of the lower layer and upper layer, had the greater production steps and the higher production cost.

The invention claimed is:

1. An exhaust gas purifying catalyst structure comprising:
   a metal support comprising a mantle and a metal foil provided inside the mantle and forming an exhaust gas flow path; and
   a catalyst layer provided on a surface forming the flow path of the metal foil, wherein
   the catalyst layer comprises a noble metal, an OSC material comprising cerium and a rare-earth element other than cerium (non-Ce rare-earth element), and alumina, and a content of the non-Ce rare-earth element with respect to 100% by mass of the catalyst layer is 2.52% by mass or more and 4.62% by mass or less in terms of an oxide,
   the metal foil is made of stainless steel comprising aluminum, and
   a content of aluminum in the metal foil is 3.0% by mass or more and 6.0% by mass or less.

2. The exhaust gas purifying catalyst structure according to claim 1, wherein the non-Ce rare-earth element comprises neodymium, and a content of neodymium with respect to 100% by mass of the catalyst layer is 1.48% by mass or more and 4.20% by mass or less in terms of an oxide.

3. The exhaust gas purifying catalyst structure according to claim 2, wherein the non-Ce rare-earth element comprises lanthanum, and a content of lanthanum with respect to 100% by mass of the catalyst layer is 0.42% by mass or more and 1.23% by mass or less in terms of an oxide.

4. The exhaust gas purifying catalyst structure according to claim 1, wherein the non-Ce rare-earth element comprises lanthanum, and a content of lanthanum with respect to 100% by mass of the catalyst layer is 0.42% by mass or more and 1.23% by mass or less in terms of an oxide.

5. The exhaust gas purifying catalyst structure according to claim 1, wherein the noble metal comprises palladium and rhodium.

6. The exhaust gas purifying catalyst structure according to claim 1, wherein the metal support comprises a flat metal foil and a corrugated metal foil.

7. The exhaust gas purifying catalyst structure according to claim 1, a ratio of a content (% by mass) of the non-Ce rare-earth element in the catalyst layer to the content (% by mass) of aluminum (Al) in the metal foil (non-Ce rare-earth element/Al) is 0.46 or more and 0.84 or less.

8. The exhaust gas purifying catalyst structure according to claim 1, wherein a thickness of the metal foil is 20 μm or more and 60 μm or less.

9. The exhaust gas purifying catalyst structure according to claim 1, wherein the exhaust gas purifying catalyst structure is for saddle-ridden type vehicles.

10. A method for producing the exhaust gas purifying catalyst structure according to claim 1, comprising:
  a step of adding alumina to a solution comprising a first noble metal and supporting the first noble metal on the alumina to form a first slurry comprising the alumina supporting the first noble metal, adding the OSC material comprising the cerium and the rare-earth element other than cerium (non-cerium rare-earth element) and a solution comprising a second noble metal to the first slurry in this order, and supporting the second noble metal on the OSC material to form a second slurry further comprising the OSC material supporting the second noble metal; and
  a step of attaching the second slurry to the metal support comprising the mantle and the metal foil provided inside the mantle and forming the exhaust gas flow path to form the catalyst layer, wherein
  the catalyst layer comprises the non-Ce rare-earth element in a content with respect to 100% by mass of the catalyst layer of 2.52% by mass or more and 4.62% by mass or less in terms of an oxide.

11. The method for producing the exhaust gas purifying catalyst structure according to claim 10, wherein the first noble metal is palladium and the second noble metal is rhodium.

12. The method for producing the exhaust gas purifying catalyst structure according to claim 10, wherein the non-Ce rare-earth element in the catalyst layer comprises neodymium, and a content of neodymium with respect to 100% by mass of the catalyst layer is 1.48% by mass or more and 4.20% by mass or less in terms of an oxide.

13. The method for producing the exhaust gas purifying catalyst structure according to claim 10, wherein the non-Ce rare-earth element in the catalyst layer comprises lanthanum, and a content of lanthanum with respect to 100% by mass of the catalyst layer is 0.42% by mass or more and 1.23% by mass or less in terms of an oxide.

14. The method for producing the exhaust gas purifying catalyst structure according to claim 10, a ratio of a content (% by mass) of the non-Ce rare-earth element in the catalyst layer to a content (% by mass) of aluminum (Al) in the metal foil (non-Ce rare-earth element/Al) is 0.46 or more and 0.84 or less.

\* \* \* \* \*